US005128110A

United States Patent [19]

Soga et al.

[11] Patent Number: 5,128,110

[45] Date of Patent: Jul. 7, 1992

[54] OZONE REMOVING DEVICE FOR IMAGE FORMING EQUIPMENT

[75] Inventors: Setsuo Soga, Tokyo; Katsuji Watabe, Fujimi, both of Japan

[73] Assignee: Ricoh Company, Ltd., Tokyo, Japan

[21] Appl. No.: 654,896

[22] Filed: Feb. 13, 1991

[30] Foreign Application Priority Data

| | | | |
|---|---|---|---|
| Feb. 13, 1990 | [JP] | Japan | 2-11957[U] |
| Feb. 19, 1990 | [JP] | Japan | 2-15416[U] |
| Mar. 23, 1990 | [JP] | Japan | 2-29103[U] |
| May 10, 1990 | [JP] | Japan | 2-48710[U] |
| May 10, 1990 | [JP] | Japan | 2-48711[U] |
| Jun. 1, 1990 | [JP] | Japan | 2-58035[U] |
| Oct. 11, 1990 | [JP] | Japan | 2-106778[U] |

[51] Int. Cl.[5] .................. B01D 50/00

[52] U.S. Cl. .................. 422/168; 55/279; 55/387; 55/524; 423/581; 355/215

[58] Field of Search .................. 55/279, 387, 524, 124; 422/168; 423/581; 355/215

[56] References Cited

U.S. PATENT DOCUMENTS

| | | | |
|---|---|---|---|
| 2,838,130 | 6/1958 | Lemmon | 55/233 |
| 3,862,420 | 1/1975 | Banks et al. | 250/324 |
| 4,401,385 | 8/1983 | Katayama et al. | 355/15 |
| 4,540,268 | 9/1985 | Toyono et al. | 355/3 |
| 4,808,396 | 2/1989 | Shibanai et al. | 423/581 |
| 4,853,735 | 8/1989 | Kodama et al. | 355/215 |
| 4,939,543 | 7/1990 | Barker | 355/215 |
| 5,034,032 | 7/1991 | Yikai et al. | 55/124 |

FOREIGN PATENT DOCUMENTS

| | | |
|---|---|---|
| 2653789 | 8/1977 | Fed. Rep. of Germany . |
| 1460674 | 7/1973 | United Kingdom . |
| 1514309 | 1/1975 | United Kingdom . |

*Primary Examiner*—Bernard Nozick
*Attorney, Agent, or Firm*—Oblon, Spivak, McClelland, Maier & Neustadt

[57] ABSTRACT

A device disposed in an exhaust section of image forming equipment for removing ozone generated in the equipment. An ozone filter and an agent container containing an ozone decomposing agent therein are constructed into a single unit. The agent contained in the body of the container is prevented from blocking small openings which allow the volatile matter of the agent to pass therethrough. A seal member and flanges surrounding the open end of the container body are adhered to each other by a layer of adhesive and a two-sided adhesive tape, whereby the open end is closed before the device is used.

12 Claims, 8 Drawing Sheets

OZONE REMOVING DEVICE FOR IMAGE FORMING EQUIPMENT

BACKGROUND OF THE INVENTION

The present invention relates to a laser printer, electrophotographic copier, facsimile transceiver or similar electrophotographic image forming equipment of the type having a charger for charging the surface of a photoconductive element to form a latent image electrostatically thereon. More particularly, the present invention is concerned with a device for removing ozone generated in the equipment due to the discharge of the charger.

In image forming equipment of the type described, a high voltage is applied to a charger to charge the surface of a photoconductive element before the formation of an electrostatic latent image. In the event of discharge of the charger, air reacts to generate ozone which is apt to deteriorate the photoconductive element. While such ozone has to be driven out of the equipment, letting it out in high density is harmful. In the light of this, the equipment is usually provided with an ozone removing device thereinside. Customarily, the ozone removing device for such an application has a fan and an ozone filter. The ozone filter is disposed in, for example, a duct included in the exhaust section of the equipment. While the fan discharges air from the equipment to the outside via the ozone filter, ozone contained in the air is adsorbed by the ozone filter. A problem with this kind of device is that the ability of the ozone filter sequentially decays as the amount of ozone adsorbed thereby increases and, therefore, the life of the filter expires soon. Moreover, it is difficult to see the adequate timing for replacing the ozone filter whose life is limited as mentioned above. Should the replacement of the ozone filter be delayed, much of the ozone would be driven out of the equipment without being removed. Such an implementation, therefore, does not meet today's severe restrictions on ozone density.

An agent container containing a volatile ozone decomposing agent is another conventional approach available for increasing the life of the ozone filter and preventing the dense ozone from flowing out of the equipment surely and stably over a long period of time. The agent container is disposed in the exhaust section of the equipment together with the ozone filter and made up of a container body and a lid having a plurality of small openings. The container body accommodates the ozone decomposing agent therein and has an open end, while the lid closes the open end of the container body and allows the volatile matter of the agent to flow down through the small openings thereof. Regarding the agent, use may be made of limonen in the form of gel.

The open end of the container body of the agent container is usually sealed by a single seal member such as a polyester film in order to prevent the agent from volatilizing through the small openings of the lid in the even of transport or storage. To use the agent container, the seal member is removed from the container body to uncover all of the small openings of the lid, and then the agent container is mounted on the exhaust section of the equipment.

The conventional ozone removing device described above has various problems left unsolved, as enumerated below.

(1) The ozone filter and the agent container are fabricated independently of each other and mounted on different portions of the duct, so that the exhaust section and, therefore, the entire equipment is complicated in construction. In addition, mounting and dismounting the ozone filter and agent container one by one is troublesome. Moreover, the container body containing the ozone decomposing agent cannot be fully hermetically sealed.

(2) As the agent volatilizes with the lapse of time, the outer periphery thereof contacting the inner periphery of the container body comes off and drops. Then, the agent blocks the openings of the lid and thereby noticeably lowers the rate of volatilization of the agent, compared to the condition wherein the agent is spaced apart from the openings. This degrades ozone decomposition available with the ozone removing device.

(3) The number of openings formed through the lid is so selected as to cause the agent to volailize at an adequate rate. However, the number of openings becomes short as the ozone filter deteriorates. While a greater number of openings will eliminate such a problem, they bring about another problem that the agent volatilizes more than necessary and is, therefore, simply wasted at the initial stage of use.

(4) A container body made of polypropylene is commercially available and predominant today. This kind of container body withstands heat and, therefore, allows the open end thereof to be fully sealed by aluminum foil or similar sealing member under the application of heat and pressure at flanges thereof which surround the open end. The agent container with such a container body, however, is not desirable from safety standpoint. Specifically, when an accident such as an ignition occurs in the image forming equipment, especially the exhaust section thereof, the sealed portion is apt to soften or even break to cause the agent to leak therethrough and burn. The container body, therefore, should preferably be made of metal, but such a container body cannot be sealed by heat and pressure. When the container body is made of metal, the open end thereof is usually sealed by the adhesion of a two-sided adhesive tape to the flanges or the application of adhesive thereto. Nevertheless, the adhesion of the flanges of the container body and the sealing member is not sufficient since the container body is made of metal. Regarding two-liquid type epoxy-based adhesive, for example, although the adhesion is sufficient in the initial stage, the agent turns out to be a solvent with the lapse of time and thereby weakens the adhesion, causing the sealing member to come off. In this case, the agent leaks little since the adhesive exhibits good surface contact. While a two-sided adhesive tape exerts a strong adhering force, it cannot prevent the agent from leaking since its surface contact is poor.

(5) The equipment with the conventional ozone removing device is capable of removing a substantial part of ozone brought to the exhaust section thereof. However, ozone entered, for example, the space between the side wall and the front cover of the equipment cannot be removed and stays there. This part of ozone is undesirably released to the atmosphere when the front cover of the equipment is opened.

SUMMARY OF THE INVENTION

It is therefore an object of the present invention to eliminate the above-discussed problems particular to image forming equipment with a conventional ozone removing device which uses an ozone filter and an agent container.

A device for removing ozone generated in image forming equipment of the present invention comprises an ozone filter disposed in an exhaust section of the equipment, and an agent container constructed integrally with the ozone filter and disposed in the exhaust section for feeding a volatile matter of an ozone decomposing agent to the ozone filter.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
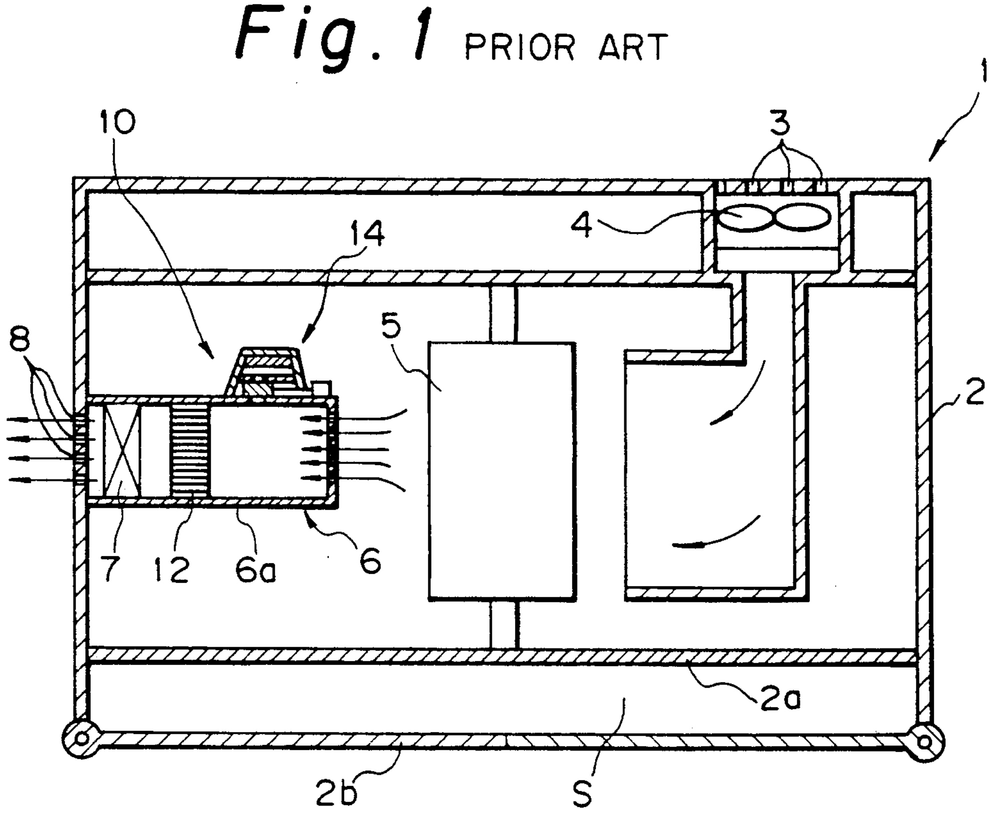
Fig. 1 PRIOR ART
FIG. 1 is a section showing a specific construction of image forming equipment having a conventional ozone removing device.

To better understand the present invention, a brief reference will be made to a prior art ozone removing device for image forming equipment, shown in FIG. 1. As shown, the ozone removing device, generally 10, is disposed in image forming equipment 1 having a ventilation arrangement. Specifically, a first fan or suction fan 4 sucks clean air from the outside of the equipment 1 through a number of apertures 3 formed in a housing 2. A second fan or exhaust fan 7 is disposed in a duct **6*a* which forms part of an exhaust section 6. Air sucked into the equipment 1 by the fan 4 is driven out of the same by the fan 7 through a number of apertures 8 also formed in the housing 2. Ozone generated in the housing 2 due to the discharge of a charger, not shown, is entrained by such a stream of air to the outside of the housing 2**.

The ozone removing device 10 has an ozone filter 12 positioned in the duct **6*a*, and an agent container 14 accommodating an ozone decomposing agent therein and mounted on the outer periphery of the duct 6*a*. The housing 2 of the equipment 1 has a side wall 2*a* and a front cover 2*b*** which define a space S therebetween.

Figure 2:
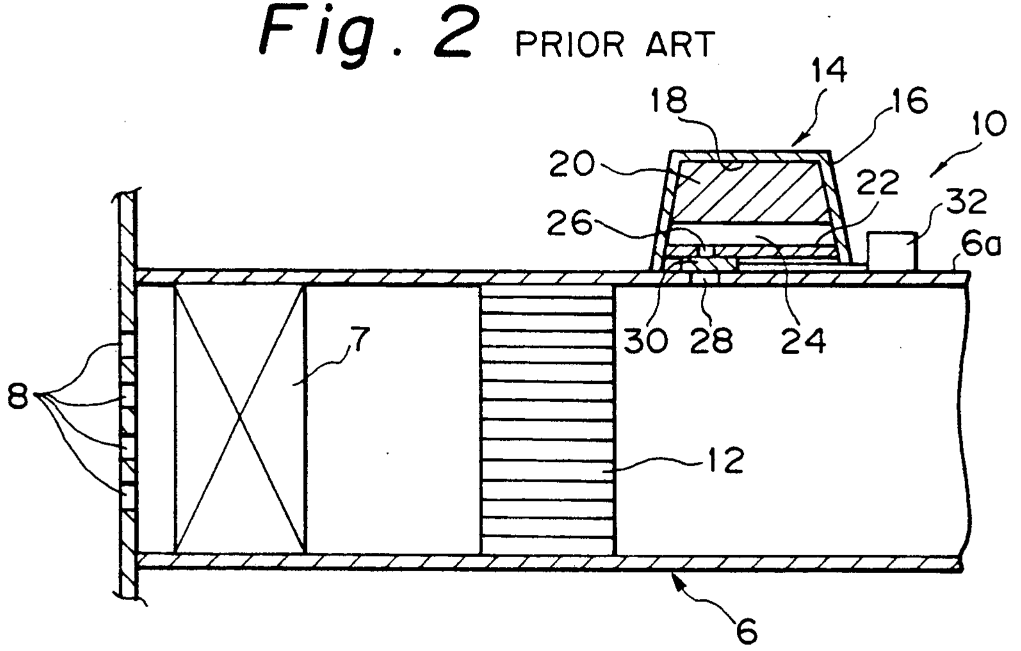
Fig. 2 PRIOR ART
FIG. 2 is a section showing a specific construction of the conventional ozone removing device.
Figure 3:
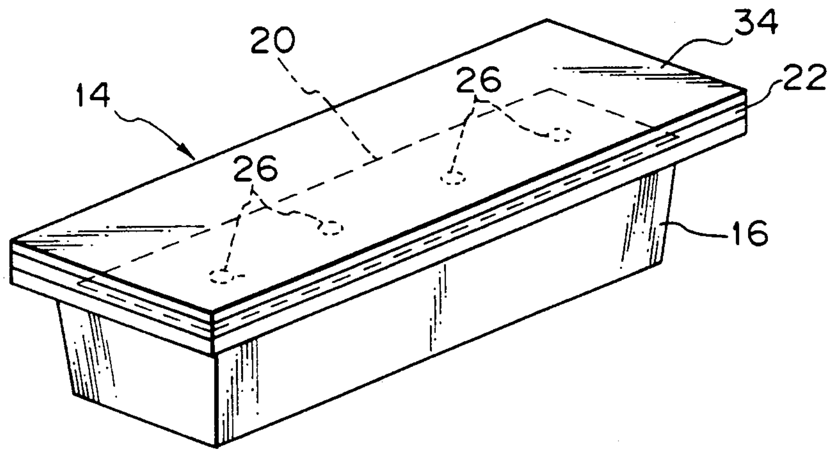
Fig. 3 PRIOR ART
FIG. 3 is a perspective view of an agent container included in the conventional ozone removing device.

As shown in FIGS. 2 and 3, the agent container 14 has a body 16 holding a volatile ozone decomposing agent 20 at the bottom 18 thereof, and a lid 22 closing the open end 24 of the body 16. The lid 22 is formed with a plurality of small openings 26 so that the volatile matter of the agent 20 may pass therethrough. Openings 28 are formed through the wall of the duct **6*a* to let the volatile matter into the duct 6*a*. A closure member 30 for opening and closing the openings 28 and a knob 32 for moving the closure member 30 are mounted on the duct 6*a*. In FIG. 3, the reference numeral 34 designates a polyester film or similar single seal member which seals the openings 26, i.e., open end 24 of the container body 16. The seal member 34 prevents the agent 20 from volatilizing through the openings 26 of the lid 22 while the container 14** is in transport or storage.

The conventional ozone removing device 10 has various problems, as discussed earlier. The problems will be described more specifically with reference to the figures.

(1) The ozone filter 12 and the agent container 14 are produced independently of each other and mounted on different portions of the duct **6*a*, so that the exhaust section 6 and, therefore, the entire equipment 1 is complicated in construction. In addition, mounting and dismounting the ozone filter 12 and agent container 14 one by one is troublesome. Moreover, the container body 16 containing the agent 20** cannot be fully hermetically sealed.

(2) As the agent 20 volatilizes with the lapse of time, the outer periphery thereof contacting the inner periphery of the container body 16 comes off and drops. Then, the agent 20 stops the openings 26 of the lid 22 and thereby noticeably slows down the volatilization of the agent 20, compared to the condition wherein the agent 20 is spaced apart from the openings 26. This degrades ozone decomposition available with the ozone removing device 10.

(3) The number of openings 26 formed through the lid 22 is so selected as to cause the agent 20 to volatilize at an adequate rate. However, the number of openings 26 becomes short as the ozone filter 12 deteriorates. While a greater number of openings 26 will eliminate such a problem, they bring about another problem that the agent 20 volatilizes more than necessary and is, therefore, simply wasted at the initial stage of operation.

(4) A container body 16 made of polypropylene is commercially available and predominant today. This kind of container body 16 withstands heat and, therefore, allows the open end 24 thereof to be fully sealed by aluminum foil or similar sealing member 34 under the application of heat and pressure at flanges thereof which surround the open end 24. The agent container 14 with such a container body 16, however, is not desirable from safety standpoint. Specifically, when an accident such as an ignition occurs in the image forming equipment, especially the exhaust section 6 thereof, the sealed portion is apt to soften or even break to cause the agent 20 to leak therethrough and burn. The container body 16, therefore, should preferably made of metal, but such a container body 16 cannot be sealed by heat and pressure. When the container body 16 is made of metal, the open end 24 thereof is usually sealed by the adhesion of a two-sided adhesive tape to the flanges or the application of adhesive thereto. Nevertheless, the adhesion of the flanges of the container body 16 and the seal member 34 is not sufficient since the container body 16 is made of metal. Regarding two-liquid type epoxy adhesive, for example, although the adhesion is sufficient in the initial stage, the agent 20 turns out to be a solvent with the lapse of time and thereby weakens the adhesion, causing the seal member 34 to come off. In this case, the agent 20 leaks little since the adhesive exhibits good surface contact. While a two-sided adhesive tape exerts a strong adhering force, it cannot prevent the agent 20 from leaking since its surface contact is poor.

(5) The equipment 1 with the conventional ozone removing device 10 is capable of removing a substantial part of ozone brought to the exhaust section 6 thereof. However, ozone entered, for example, the space S between the side wall 2*a* and the front cover of the equipment 1 cannot be removed and stays there. This part of ozone is released to the atmosphere when the front cover 2*b* is opened.

Preferred embodiments of the ozone removing device in accordance with the present invention which are free from the above problems (1) to (5) will be described. In the figures, the same or similar components and structural elements are designated by like reference numerals, and redundant description will be avoided for simplicity.

Figure 4:
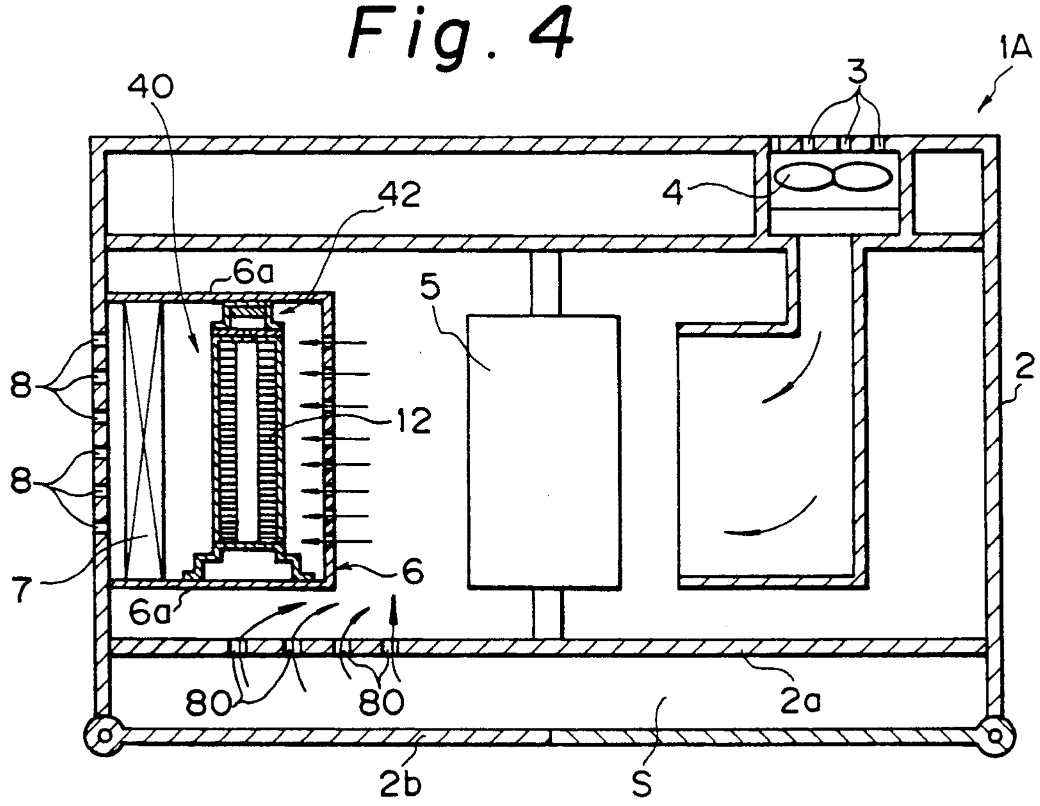
FIG. 4 is a section showing a specific construction of image forming equipment implemented with an ozone removing device embodying the present invention.

Referring to FIG. 4, image forming equipment 1A implemented with an ozone removing device 40 embodying the present invention is shown. As shown, the ozone removing device 40 has an ozone filter 12 and an agent container 42. The ozone filter 12 is disposed in a duct 6*a* included in an exhaust section 6 of the equipment 1A. The agent container 42 is constructed integrally with the ozone filter 12 and also disposed in the duct 6*a*.

Figure 5:
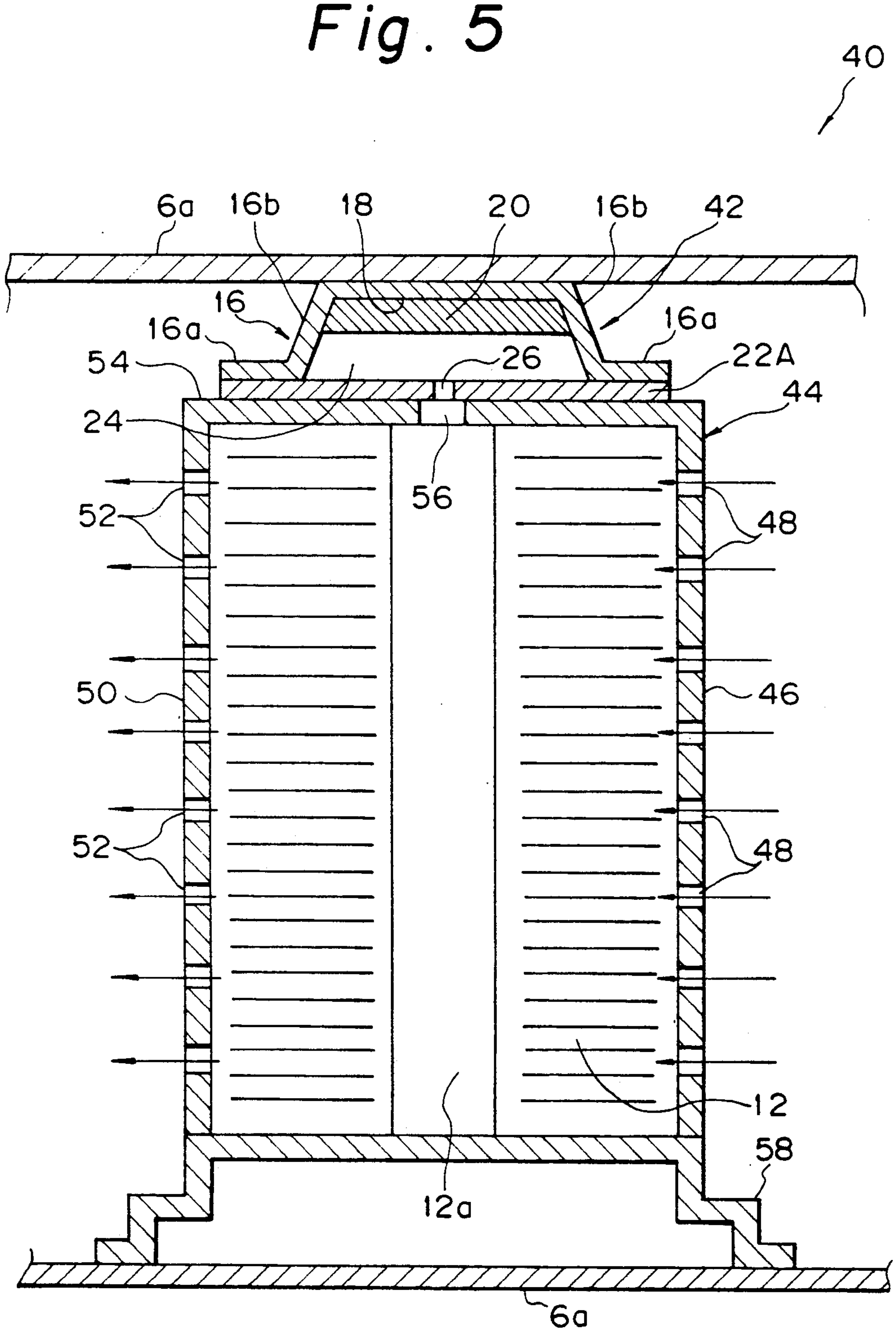
FIG. 5 is a section showing a specific construction of the ozone removing device shown in FIG. 4.

As shown in an enlarged view in FIG. 5, the ozone filter 12 is accommodated in a casing 44 and has a bore 12*a* at the center thereof. The casing 44 has a side wall 46 formed with a number of openings 48, a side wall 50 formed with a number of openings 52, and a top wall 54 formed with openings 56. A stream of air entraining ozone flows into the ozone filter 12 through the openings 48 of the side wall 46 and out of the filter 12 via the openings 52 of the side wall 50. The casing 44 is affixed to the inner periphery of the duct 6*a* through a support 58. The agent container 42 has a body 16 and a lid 22A. The body 16 has flanges 16*a* and accommodates a volatile ozone decomposing agent 20. The lid 22A closes the open end 24 of the container body 16 and has a plurality of small openings 26 to allow the volatile matter of the agent 20 to pass therethrough. Opposite side walls 16*b* of the container body 16 are inclined toward each other such that the distance therebetween sequentially decreases from the open end 24 to the bottom 18. The agent container 42 is constructed integrally with the filter casing 44 at the top wall 54 of the latter, as illustrated. The volatile matter of the agent 20 enters the bore 12*a* of the ozone filter 12 through the openings 56 of the filter casing 44 and is adsorbed by the ozone filter 12.

In operation, when ozone-containing air enters the filter casing 44 through the openings 48 of the side wall 46 and flows through the ozone filter 12, ozone is removed by the volatile matter of the agent 20 adsorbed by the filter 12. Then, the ozone-free air leaves the filter casing 44 via the openings 52 of the other side wall 50. The air coming out of the filter casing 44 is driven out of the housing 2 of the equipment 1A by an exhaust fan 7 through openings 8 formed in a housing 2, as shown in FIG. 4. When the ozone filter 12 is deteriorated or the agent 20 is consumed, the entire assembly of the ozone filter 12 and agent container 42, i.e., the ozone removing device 40 is bodily taken out from the duct 6*a* of the equipment 1A. Afterwards, a fresh ozone removing device 40 is set in the duct 6*a*.

The ozone removing device 40 is characterized not only by the integral assembly of the ozone filter 12 and agent container 42 but also by the construction of the agent container 42 itself. Specific constructions of the agent container 42 in accordance with the present invention will be described.

Figure 6:
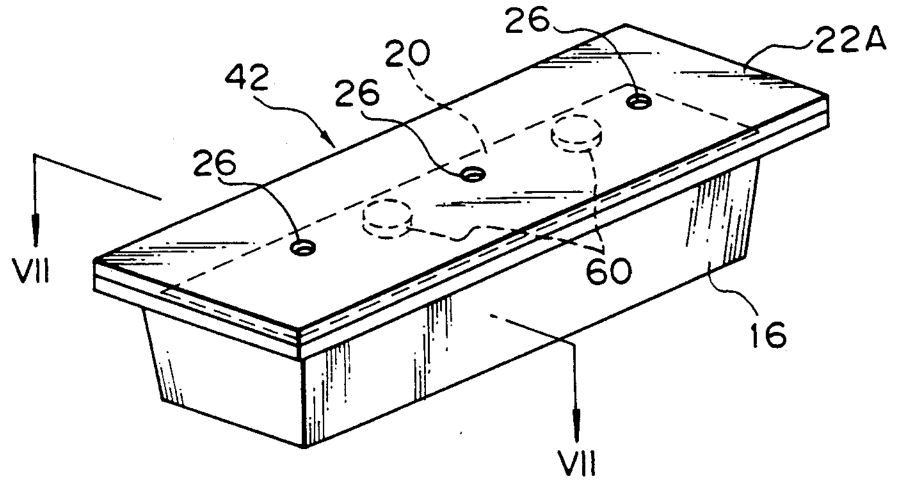
FIG. 6 is a perspective view of a specific construction of an agent container included in the device of FIG. 5.
Figure 7:
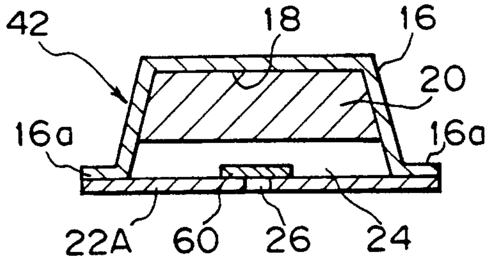
FIGS. 7 and 8 are sections along line VII—VII of FIG. 6.
Figure 8:
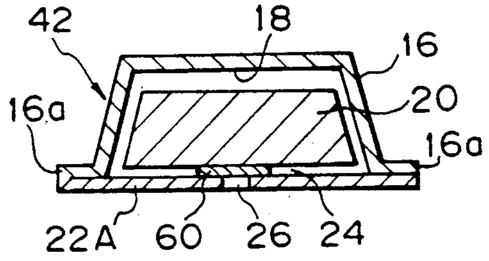
Figure 9:
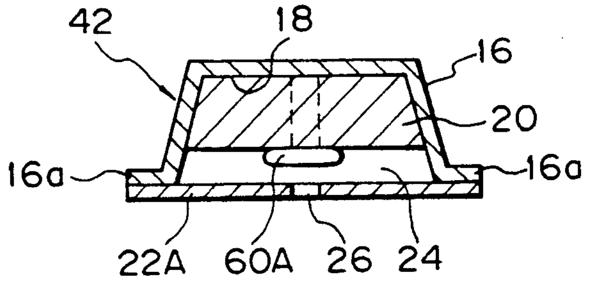
FIG. 9 is a section of an agent container which is a modified form of the configuration shown in FIGS. 6 through 8.

Referring to FIGS. 6 through 7, a plurality of stops 60 implemented as disks, for example, are provided on the inner surface of the lid 22A in such a manner as not to coincide with the small openings 26. When the outer periphery of the agent 20 comes off the inner periphery of the container body 16 due to the volatilization of the agent 20, it drops toward the lid 22A. At this instant, as shown in FIG. 8, the stops 60 provided on the lid 22A receive the agent 20 to prevent it from contacting and closing the openings 26 of the lid 22A. In this condition, the volatile matter of the agent 20 is successfully introduced into the bore 12*a* of the ozone filter 12 in a sufficient amount through the openings 26. As shown in FIG. 9, the stops 60 of the lid 22A may be replaced with a member 60A which is retained by a support 62. In such a configuration, the agent 20 is affixed to the container body 16 beforehand and prevented from dropping by the member 60A.

Figure 10:
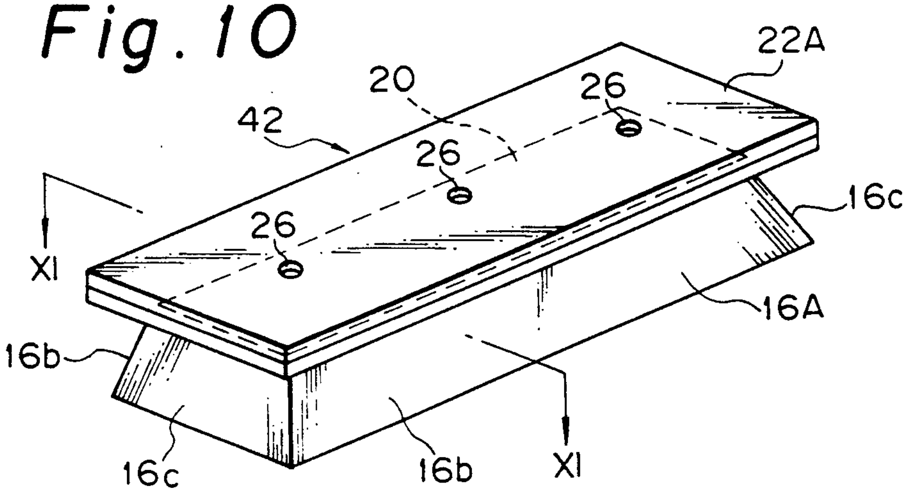
FIG. 10 is a perspective view showing another specific configuration of the agent container.
Figure 11:
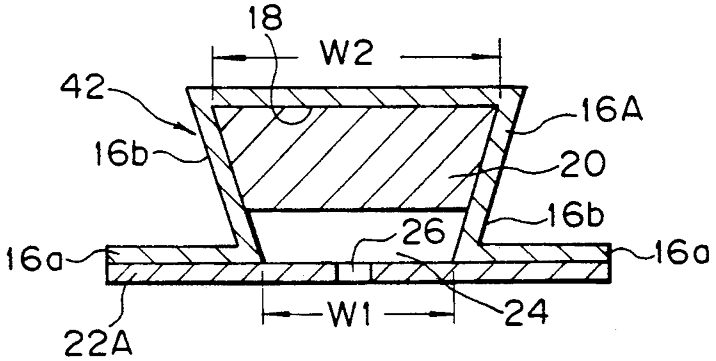
FIG. 11 is a section along line XI—XI of FIG. 10.

FIGS. 10 and 11 show another specific construction of the agent container 42 in which a container body 16A has opposite side walls 16*b* inclined away from each other such that the distance therebetween sequentially increases from the open end 24 to the bottom 18. Hence, the open end 26 of the container body 16A has a width W1 which is smaller than the width W2 of the bottom 18, i.e., the open end 26*a* has a smaller area than the bottom 18. In this configuration, the inclined side walls 16*b* of the container body 16A prevent the agent 20 from dropping even when the latter comes off the inner periphery of the container body 16A due to volatilization. Otherwise, the agent would stop the openings 26 of the lid 22A. If desired, opposite end walls 16*c*, FIG. 10, of the container body 16A may be inclined in place of the opposite side walls 16*b*, or even both of the side walls 16*b* and end walls 16*c* may be inclined.

Figure 12:
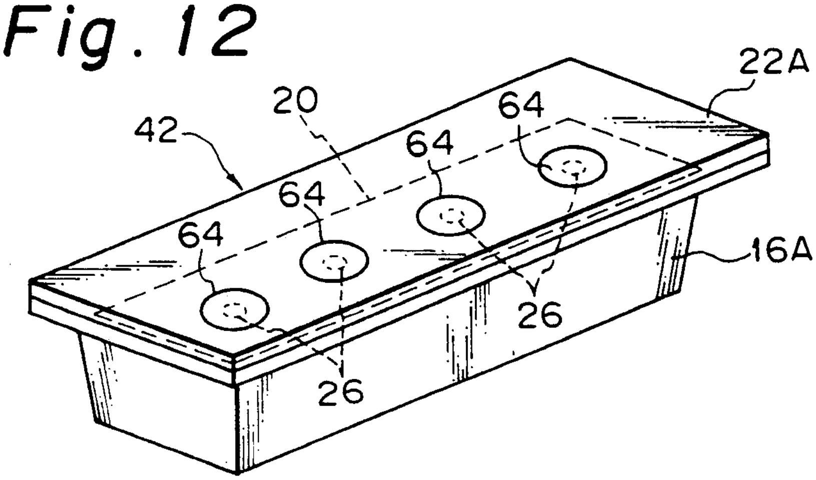
FIG. 12 is a perspective view showing another specific configuration of the agent container.

FIG. 12 shows another specific construction of the agent container 42 in which the openings 26 of the lid 22A each is closed by a seal member 64 before the container is used. When the agent container 42 loaded with a fresh agent 20 is set in the duct 6*a* of the equipment 1A and used, the agent 20 initially has great activity and has only to volatilize at a low rate. Hence, at first, only part of the seal members 64 is removed to uncover the associated openings 26. As the agent 20 is sequentially consumed and the ozone filter 12 is deteriorated, the remaining seal members 54 are removed to uncover all of the openings 26. This promotes efficient use of the agent 20.

Figure 13:
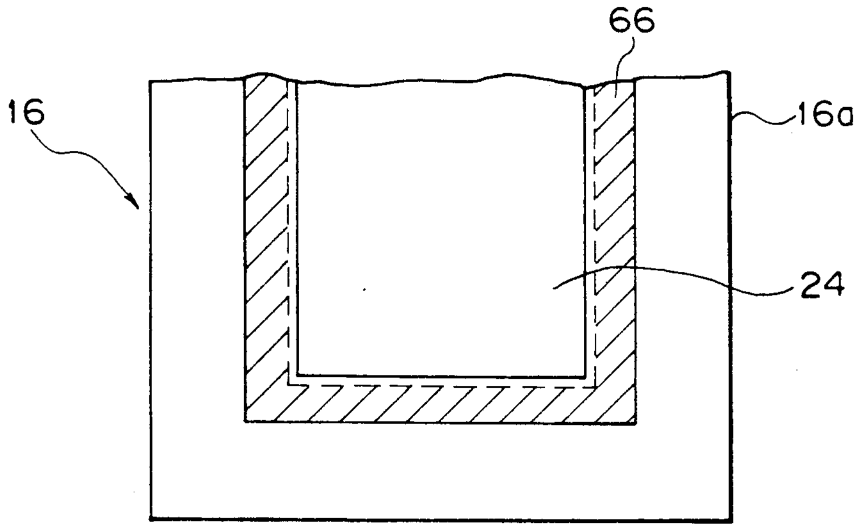
FIGS. 13 and 14 are views showing a specific implementation for closing the open end of a container body.
Figure 14:
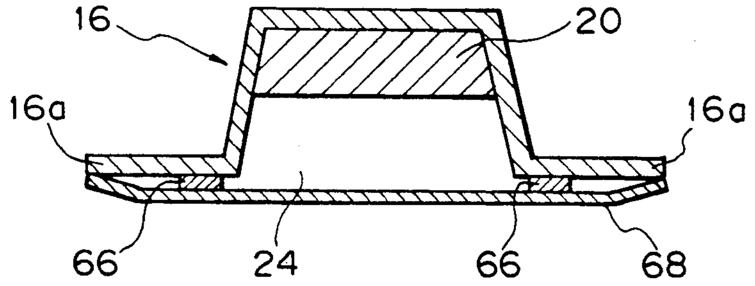

FIGS. 13 and 14 shows another specific construction of the agent container which has a unique implementation for closing the open end 24 of the container body 16 for transport and storage purposes. The container body 16 is produced by crimping a sheet of metal such as aluminum. Adhesive 66 such as two-liquid type epoxy-based adhesive is applied to part of flanges 16*a* of the container body 16. A sheet-like seal member 68 such as aluminum foil is adhered to the flanges 16*a* by the adhesive 66, whereby the open end 24 of the container body 16 is closed. The adhesive 66 prevents the volatile matter of the agent 20 from leaking to the outside through the open end 24 due to the shielding effect thereof.

Figure 15:
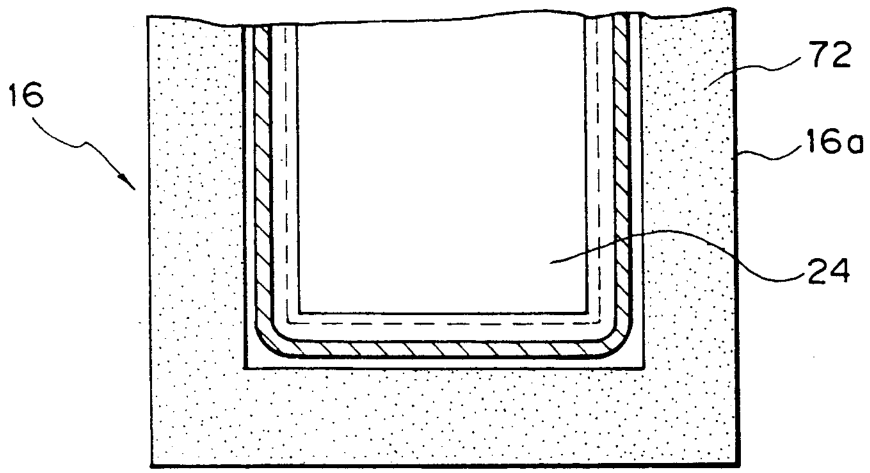
FIGS. 15 and 16 are views similar to FIGS. 13 and 15, showing an alternative implementation for closing the open end of a container body.
Figure 16:
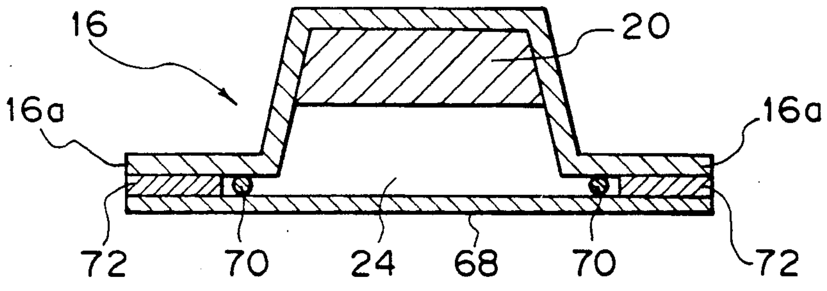

An alternative implementation for closing the open end 24 of the container body 16 for the above-mentioned purposes is shown in FIGS. 15 and 16. As shown, the adhesive 66 shown in FIGS. 13 and 14 is replaced with a shield packing member 70 made of silicone rubber or chloroprene rubber, for example, and a two-sided adhesive tape 72. The shield packing member 70 and adhesive tape 72 are applied to the flanges 16*a* of the container body 16. The shield packing member 70 shields the volatile matter of the agent 20 while the adhesive tape 72 causes the flanges 16*a* and seal member 68 to adhere strongly to each other, whereby the volatile matter of the agent 20 is prevented from leaking to the outside through the open end 24.

Figure 17:
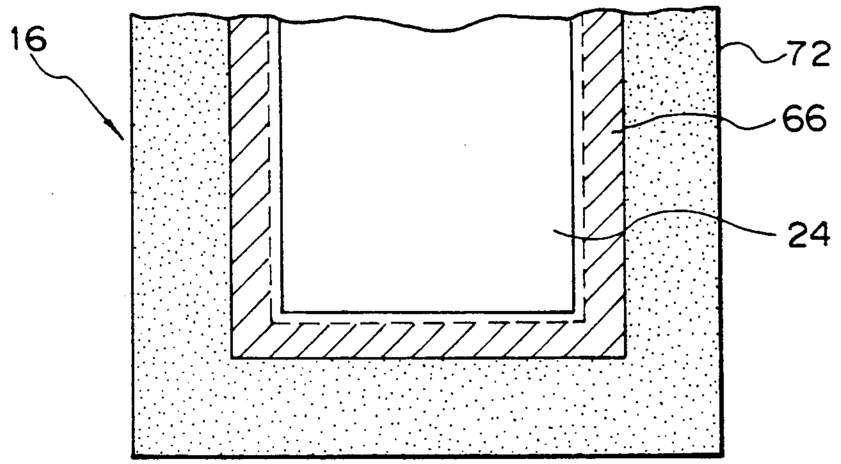
FIGS. 17 and 18 are views similar to FIGS. 13 and 15, showing another alternative implementation for closing the open end of a container body.
Figure 18:
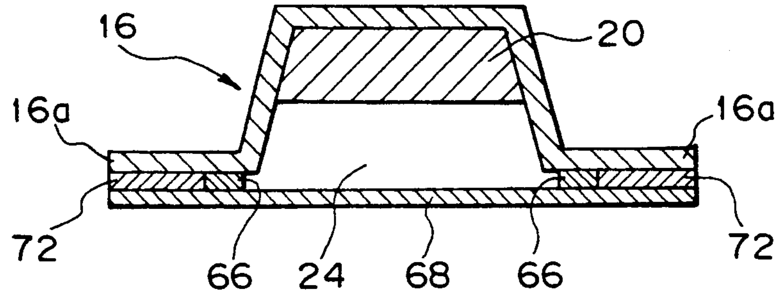

FIGS. 17 and 18 show a modified from of any one of the specific configurations stated above. As shown, the flanges 16*a* of the container body 16 and the seal member 66 are adhered to each other by the adhesive 66 and two-sided adhesive tape 72 to close the open end 24. Experiments showed that such a modified configuration eliminates leakage despite the contact of the volatile matter of the agent 20 with the adhesive 66 and fully isolates the adhesive tape 72 from the volatile matter. This, coupled with the fact that the adhesive 72 is inexpensive, realizes an extremely effective implementation for closing the open end 24.

Of course, the adhesive 66, shield packing member 70 and two-sided adhesive tape 72 may be used in various combinations other than the combinations shown and described.

As shown in FIG. 4, in the image forming equipment 1A implemented with any one of the embodiments and modification described above, the side wall 2*a* of the housing 2 is formed with vents 80. Ozone-containing air entered the space S between the side wall 2*a* and the front cover 2*b* is sucked by the fan 7 into the duct 6*a* via the vents 80. Then, the ozone filter 12 removes ozone from the air. The resulted ozone-free air is discharged to the outside of the equipment 1A. If desired, the vents 80 may be replaced with an air duct which is disposed in the space S.

In summary, it will be seen that the present invention provides an ozone removing device which eliminates all of the problems (1) to (5) particular to the conventional device as previously discussed.

Various modifications will become possible for those skilled in the art after receiving the teachings of the present disclosure without departing from the scope thereof.

What is claimed is:

1. A device for removing ozone generated in image forming equipment, comprising:

ozone filter means disposed in an exhaust section of said equipment; and agent container means constructed integrally with said ozone filter means and disposed in said exhaust section and including means for communicating a volatile matter of an ozone decomposing agent to said ozone filter means.

2. A device as claimed in claim 1, wherein said ozone filter means comprises a filter casing accommodating an ozone filter member and formed with openings for passing air therethrough.

3. A device as claimed in claim 2, wherein said agent container means comprises a container body accommodating said ozone decomposing agent and having an open end and a bottom, and a lid member closing said open end of said container body, said communicating means comprising a plurality of small openings communicating with said openings of said filter casing.

4. A device as claimed in claim 3, wherein said agent container means further comprises seal members each sealing respective one of said small openings of said lid member.

5. A device as claimed in claim 3, wherein said agent container means further comprises anti-closure means for preventing said ozone decomposing agent contained in said container body from closing said small openings of said lid member.

6. A device as claimed in claim 5, wherein said anti-closure means comprises stop means provided in a predetermined position on said lid member except for positions where said small openings are formed, said stop means preventing said ozone decomposing agent from being displaced to said small openings.

7. A device as claimed in claim 5, wherein said anti-closure means comprises a support member for securely supporting said ozone decomposing agent contained in said container body.

8. A device as claimed in claim 5, wherein said anti-closure means comprises opposite side walls forming part of said container body; said opposite side walls being inclined such that a distance therebetween sequentially increases from said open end to said bottom.

9. A device as claimed in claim 1, wherein said agent container means comprises a container body accommodating said ozone decomposing agent and having an open end which is surrounded by flanges, and a seal member adhered to said flanges for closing said open end of said container body.

10. A device as claimed in claim 9, wherein said seal member is adhered to said flanges with the intermediary of a layer of adhesive.

11. A device as claimed in claim 9, wherein said seal member is adhered to said flanges with the intermediary of a shield packing member and a two-sided adhesive tape.

12. A device as claimed in claim 9, wherein said seal member is adhered to said flanges with the intermediary of a layer of adhesive and a two-sided adhesive tape.

* * * * *